E. B. STIMPSON.
ANTISKIDDING DEVICE.
APPLICATION FILED MAR. 11, 1907.
984,499.
Patented Feb. 14, 1911.
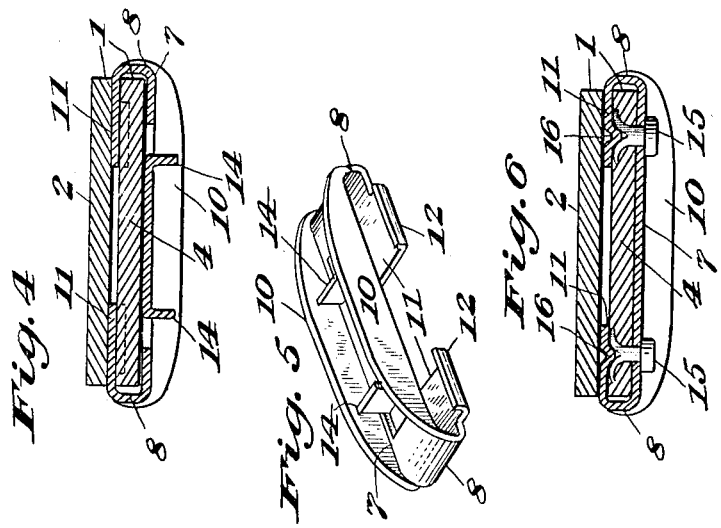
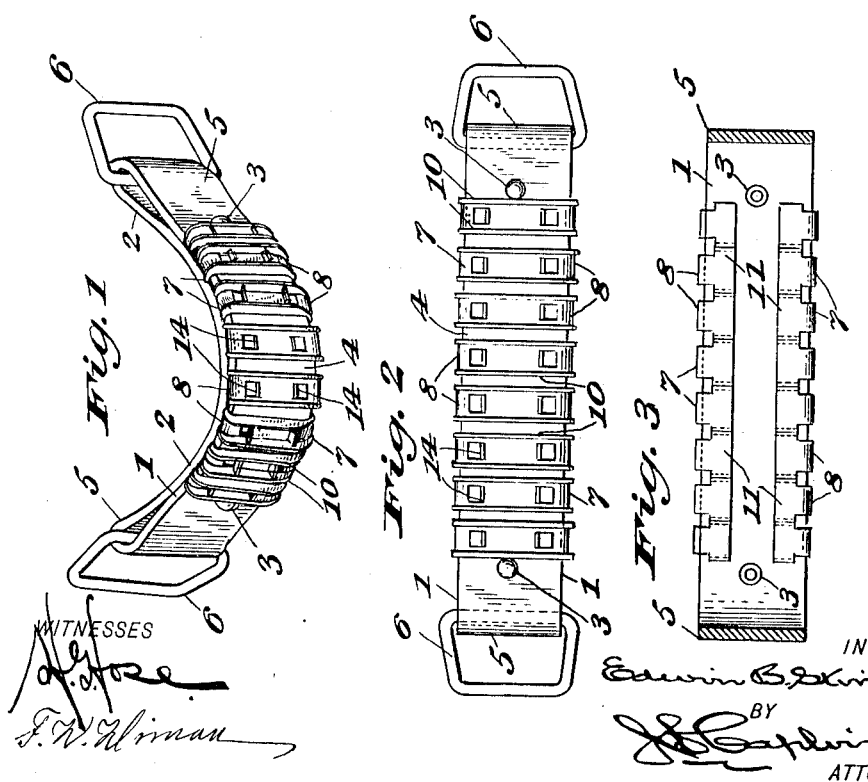
INVENTOR
Edwin B. Stimpson
BY
ATTORNEY
WITNESSES

UNITED STATES PATENT OFFICE.

EDWIN BALL STIMPSON, OF NEW YORK, N. Y., ASSIGNOR TO EDWIN B. STIMPSON COMPANY, A CORPORATION OF NEW YORK.

ANTISKIDDING DEVICE.

984,499.  Specification of Letters Patent.  Patented Feb. 14, 1911.

Application filed March 11, 1907. Serial No. 361,806.

*To all whom it may concern:*

Be it known that I, EDWIN B. STIMPSON, a citizen of the United States, residing in the borough of Brooklyn, county of Kings, city and State of New York, have invented certain new and useful Improvements in Antiskidding Devices, of which the following is a specification.

This invention relates to certain improvements in anti-skidding devices such as are adapted for use in connection with automobiles and the like for application to the wheels to prevent skidding and to protect the tires thereof, and the object of the invention is to provide a device of this general character of a simple and comparatively inexpensive nature which shall be strong, durable and capable of ready application and adapted for effective engagement with the roadway for the protection of the tires and the prevention of slipping or skidding of the wheels.

The invention consists in certain novel features and principles of construction, and combinations and arrangements of the several parts of the improved anti-skidding device, whereby certain important advantages are attained and the device is rendered simpler, cheaper and otherwise better adapted and more convenient for use, all as will be hereinafter fully set forth.

The novel features of the invention will be carefully defined in the claims.

In the accompanying drawings which serve to illustrate my invention—Figure 1 is a perspective view showing an anti-skidding device embodying my improvements and adapted for application to an automobile wheel; Fig. 2 is a face view of the device as shown in Fig. 1; Fig. 3 is a view showing the device as viewed from the rear with the rear ply of the securing material removed; Fig. 4 is a sectional view taken transversely through the device as shown in Figs. 1, 2 and 3; Fig. 5 is a perspective view of one of the individual members of the device as shown in Figs. 1, 2 and 3; Fig. 6 is a sectional view similar to Fig. 4, but showing a modified form of the individual members of the device.

As shown in these views the device embodying my improvements comprises a leather or other flexible band or strip bent on itself, the rear ply 2 of which is secured to the front ply 4 by means of rivets 3, 3 so as to produce loops 5, 5, at opposite ends of the device, with which are engaged metallic eyes 6, 6, for engagement with attaching means of any preferred kind whereby the device may be secured upon an automobile wheel or the like with the central portion 4 of the strip or band extended transversely across the tread of the tire for effective engagement with the road way as the wheel turns.

The strap or band 1 may be formed from leather or other sufficiently tough and flexible material, and upon the central part thereof are secured metallic members 7, 7 arranged in a series extended lengthwise of said strap or band. Each of said elements 7, 7, is formed of a piece or strip of metal extended transversely of the band or strap 1 with its end portions 8, 8 bent at angles so as to be adapted to extend over and protect the edge portions of the band or strap to reduce the wear thereon and also to afford a secure engagement with the roadway in the turning of the wheels to which the device is applied.

In forming up the members 7, 7, the lateral edge portions 10 10 of each blank are bent or struck up at right angles to the outer face of the blank, as seen in the drawings, so as to be adapted, when the member is in place on the band or strap 1, to project at right angles to the face thereof for engagement with the roadway, the end portions of each blank being also bent rearwardly at right angles to the central part of the blank to produce the angular end portions 8, 8, which take across and protect the edge surfaces of the band or strap 1.

The extremities of the blank, after having been bent at right-angles to produce the edge protecting parts 8, 8, are bent toward each other as shown at 11, 11 and are adapted to take behind the rear surface of the central part of the band or strap 1 and are held or housed between said central portion 4 and the lapped end portions 2, 2, in such a way as to effectively prevent such movement of the members as would be calculated to dislodge them from the band or strap. When formed or struck up in this way, the inwardly directed extremities 11, 11 of the members 7, 7, are made of greater width than the central or trough-like portion of said members, whereby, when the members are slipped on in a series extended lengthwise of the strap or band 1, the said wider extremities 11, 11 will contact at the rear face of the central part 4 of the band or strap and will serve to hold the members in position with their road-biting edges 10, 10 spaced apart for effective engagement with the roadway to prevent slipping or skidding of the wheels. The opposite edge portions 12, 12 of the inwardly bent extremities 11, 11 of the members are turned upward toward the body portions of the members, to adapt them to bind against the underside of the flexible strap when the latter is flexed to conform it to the rotundity of the tire. The upturned edges 12 therefore hold each tire-protective device against sliding along the straps or bands 1. When the members are in place upon the band or strap 1, the rivets 3, 3, at the ends thereof will serve to hold the series of members with said overturned edge portions 12, 12 in contact and will also assist in holding said members from slipping endwise along the band or strap.

Between the outwardly directed or flanged edge portions 10, 10, the metal of the body portion of each member is punched or bent outwardly at each end of the member as seen at 14 to provide transverse lugs for effective engagement with the roadway to prevent slipping or skidding.

From the above description of my improvements, it will be seen that the improved anti-skidding device is of an extremely simple and inexpensive nature and is especially well adapted for use by reason of the ease and convenience with which the device may be applied in position and of the security and protection afforded by it both against skidding or slipping of the wheels and wear of the tires, the series of members 7, 7, affording a metallic binding extended along each edge of the flexible band or strap to prevent wear and cutting thereof, and it will also be obvious from the above description that the device is susceptible of considerable change without material departure from the principles and spirit of the invention and for this reason I do not desire to be understood as limiting my improvements to use in connection with the special arrangement and construction of the band or strap, nor do I desire to be understood as limiting myself to the precise form and arrangement of the individual members as herein set forth in carrying out my invention in practice. For example, in Fig. 6 I show a modified construction of the individual members, wherein the central portion of the member, which lies at the outer face of the device, is apertured at its opposite ends for the passage of rivets 15, 15, having forked shanks adapted to be passed through the band or strap 1 and clenched against projections 16, 16 integral on the front face of the inturned extremities 11, 11 of the member in such a way as to securely hold the member in place upon the strap or band where such attachment is deemed necessary or desirable.

Having thus described my invention, what I claim and desire to secure by Letters Patent is:—

1. In an anti-skidding device, the combination of a strip of flexible material adapted to be secured transversely across the tread; metal members extending across said strip with their ends underlapping the strip, and their sides upturned to form trough-like road-biting edges; and a strip of flexible material secured under the first named strip, also under the underlapping ends of the metal members and adapted to protect the tire from said underlapping ends.

2. In an anti-skidding device the combination of a strip of flexible material adapted to be secured transversely across the tread; a plurality of road-engaging members connected with the strip and slidable lengthwise thereof; and stops on the strip confining the road-engaging members in a series between them.

3. In an anti-skidding device, the combination of a strip of flexible material adapted to be secured transversely across the tread; and road-engaging devices slidable on said strip having upturned road-biting edges transverse of the strip, and having lateral projections adapted to abut against the adjacent road-engaging device to keep the road-biting edges of said device apart.

4. In an anti-skidding device, the combination of a flexible strip of material adapted to be secured to a tire; and a metal member adapted to contact with the road, said member having its ends underlapping the sides of the strip to hold the member slidingly thereon, said underlapping ends having their sides extending beyond the sides of the road-contacting face of the member to adapt them to bind fixedly against the strip, when said strip is flexed to conform to the rotundity of the tire.

5. In an anti-skidding device, the combination of a strip of flexible material adapted to be secured to a tire; and a metal member adapted to contact with the road, said member having its ends underlapping the sides of the strip to hold the member slidingly thereon and having the lateral portions of said underlapping ends upturned to bind fixedly against the strip when the latter is flexed to conform to the rotundity of the tire.

6. An anti-skidding device comprising a metal strip having underlapping ends 11, and further having lateral portions 12 extending from said underlapping ends.

7. An anti-skidding device comprising a metal trough-like member having sides 10, upturned transverse lugs 14 springing from the bottom of its trough, and further having underlapping ends 11.

In witness whereof I have hereunto signed my name this 9th day of March 1907, in the presence of two subscribing witnesses.

EDWIN BALL STIMPSON.

Witnesses:
H. G. HOSE,
WILLIAM J. FIRTH.